Figure 7:
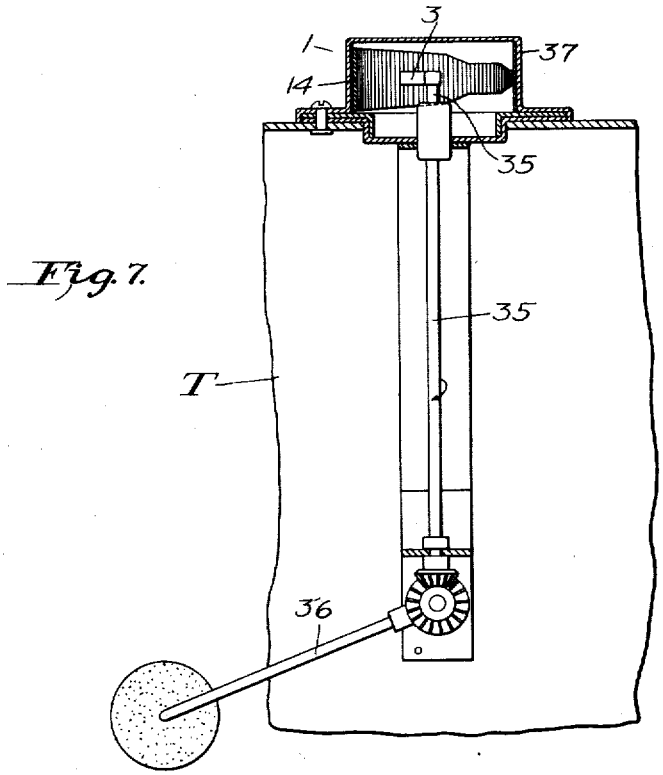

Feb. 4, 1930.                M. E. CHENEY                1,745,782
         METHOD AND APPARATUS FOR ELECTRICAL INDICATING DEVICES
                    Filed July 3, 1928        2 Sheets-Sheet 1
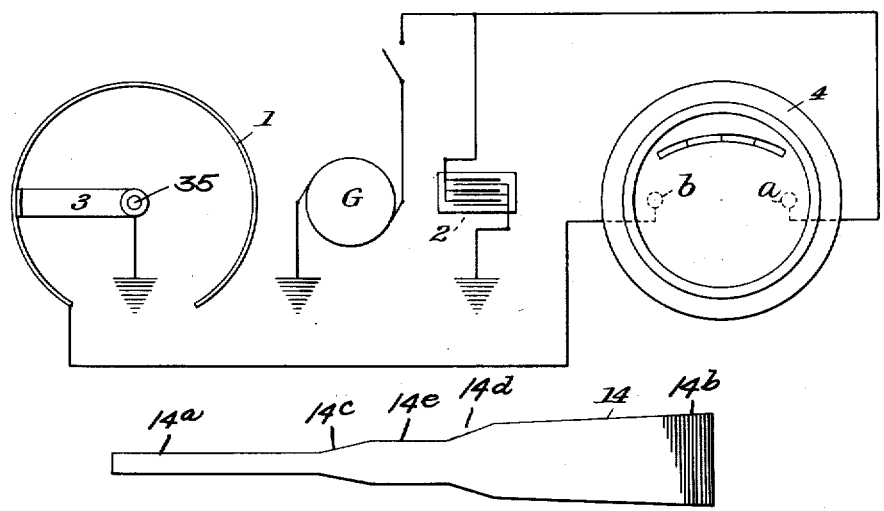
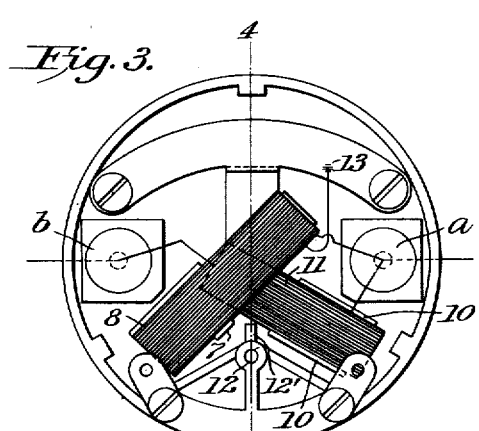
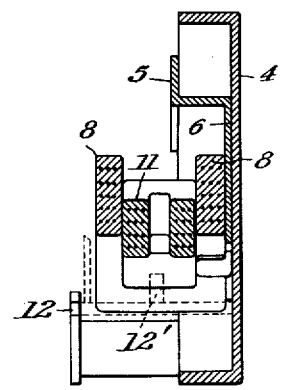
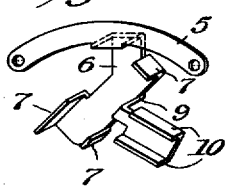
Inventor
Moses E. Cheney
By Attorneys
Nathan & Bowman Feb. 4, 1930.  M. E. CHENEY  1,745,782
METHOD AND APPARATUS FOR ELECTRICAL INDICATING DEVICES
Filed July 3, 1928  2 Sheets-Sheet 2

Patented Feb. 4, 1930

1,745,782

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

METHOD AND APPARATUS FOR ELECTRICAL INDICATING DEVICES

Application filed July 3, 1928. Serial No. 290,173.

The invention relates to an electric liquid level measuring instrument suitable for use particularly as a gasoline gauge for the modern automobile and similar conveyances. The object of the invention is to devise a non-precision instrument of the foregoing general character, which will be sufficiently accurate for its intended purpose, an essential feature being that the indicator can be seen by the operator from his seat while the tank is placed at the rear of the car. Another object has been to simplify the instrument and reduce the cost thereof so as to supplant the hydrostatic gauge which has been too expensive to build.

There were many difficulties to be overcome in adapting an electric measuring instrument for use as a gasoline gauge on a motor car, due to the requirements of the automobile manufacturer.

First, the instrument must compensate for currents of different and varying voltages, due to the widespread use of a battery and a generator in the same electric circuit and this necessarily required an indicating instrument of a differentially wound type. A common form of such instrument is what is known as a cross-coil instrument, but same has not been satisfactory for use in an electric measuring instrument and required a specially designed armature capable of extending through both coils, as set forth in Letters Patent No. 1,657,855 and special provisions have been made for overcoming unbalanced torques.

Second, the instrument must be capable of use with the standard type of tank float fitting, which is securely mounted in the tank at the rear of the car. This standard form of fitting is of the float arm geared type, such as shown and described in Letters Patent No. 1,657,855 Fig. 11, having a rheostat housing of rather limited dimensions. This necessitated the provision of a form of rheostat capable of fitting within said relatively small housing.

Third, the complicated wiring of the modern motor car makes it highly undesirable to complicate it further by employing what is known as a two-wire system which consists generally of two wires and a ground return or two circuits. To simplify the additional wiring caused by the addition of an electric gas gauge, and to enable the regular employees of any motor car factory to install the gauge, it was highly desirable to have a single circuit with a single lead wire and a minimum of terminals, thereby eliminating all danger of short-circuiting as well as loose connections.

Fourth, another requirement is that the gauge be suitable for different makes of cars and that it may be kept in service by ordinary service stations, and while electric gasoline gauges having permanent magnets have been known to be capable of use in a single circuit, such instruments have not proved to be practical by reason of the fact that different makes of cars use different polarities.

Fifth, another requirement that had to be met by the gauge intended for use with the modern motor car is the standard scale range, the manufacturers having become accustomed to and demanding a scale range of not less than 60 degrees.

Sixth, another requirement is the reduction in the cost and labor of the parts of the electric gasoline gauge; for a saving of a few cents per gauge has often resulted in a very large saving to motor car manufacturers who turn out thousands of cars per day.

Seventh, another requirement of the modern gasoline gauge applied to the modern automobile is that there shall be a scale of substantially uniform graduations throughout the scale range.

In meeting these requirements many practical difficulties have arisen in the construction of such a gauge. For one thing, there was no form of rheostat suitable for use with the cross-coil instrument and insertable within the housing commonly used with the modern float arm geared type of gauge. For another thing, there was no electrical instrument suitable for this use. The D'Arsonval galvanometer could not be used because it was not practical to use more than 40% of its regular scale length, and it does not compensate for variations of voltage. If a greater portion of the scale length were used, the rheostat resistor could not be wound properly. With the standard form of rheostat housing only ⅓ of its regular scale range could be used and any greater scale range interfered with the rheostat being properly mounted in the housing. It was only by combining the cross-coil instrument with the rheostat shown herein that a satisfactory electric gas gauge was devised for use in a single circuit adapted to the modern automobile.

Throughout this specification the zero or empty position is termed the high resistance end while the full position of the tank is termed the low resistance end. This is due to the fact that in properly mounting a differentially wound instrument in a single circuit, one of the two coils must be connected across the source of current (the battery and generator) while the other is connected in series with the resistor of the rheostat, and consequently the voltage of the current across the series coil varies in inverse proportion to the effective resistance of the rheostat. For instance, if the current passing through the series coil is to be reduced one-half of its original amount to indicate one-half position, it is necessary to double the resistance of the circuit and likewise to reduce the current to one-fourth of its original amount requires quadrupling the resistance of the circuit. It is therefore apparent that at the one-sixteenth point a more rapidly increasingly amount of resistance must be applied to the resistor than at the half-way position of the pointer. Although it has long been recognized that, with the modern gasoline gauge a strap form of resistor was desirable because it simplified the construction of the rheostat and eliminated a large number of contact buttons, and was almost essential for use with the housing used with the modern float arm gauge such as shown in the Winterhoff Patent No. 1,522,355 there was no strap form of resistor adapted for use with the housing used at the top of the gas tank until applicant devised his construction. A very serious difficulty was to avoid using a resistor with a too pronounced taper at its intermediate part, as such taper precludes the wire from remaining properly positioned on the resistor base as wound. It has been found that by connecting the resistor shown in applicant's Fig. 2 with the cross-coils arranged at substantially the angle of Fig. 3 the foregoing difficulty is obviated and likewise in this manner all the foregoing requirements have been met.

Figure 6:
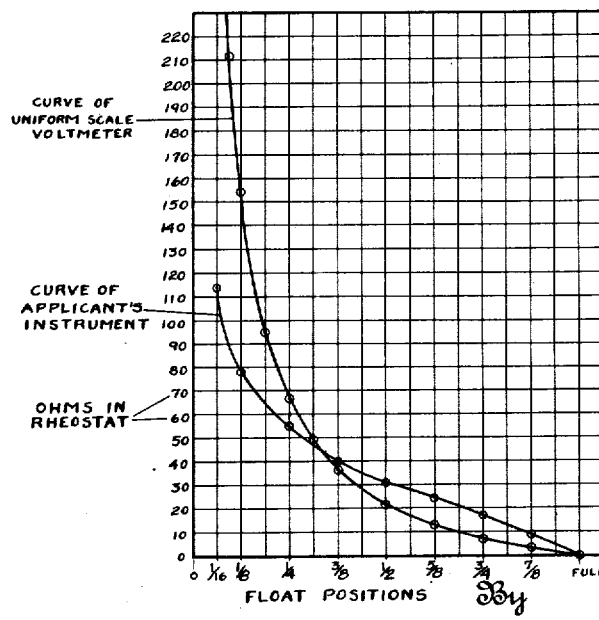

Referring to the drawings, Fig. 1 is a diagrammatic view of the apparatus. Fig. 2 is a detail view of the rheostat support or base. Fig. 3 is a plan view of the indicating head or instrument. Fig. 4 is a sectional view taken on the line 4—4 of Fig. 3 and Fig. 5 is a detail of the bracket support for the coils of the indicating instrument permitting one to be adjusted in its relation to the other. Fig. 6 is a graphical representation of the resistances required by (1) a uniform scale voltmeter and (2) by the applicant's cross coil instrument, for the indication of various liquid level positions. Fig. 7 is a fragmentary sectional detail view of a gasoline tank, associated with which is a float controlled mechanism for traversing the wiper element over the concave surface of the rheostat resistance element shown in Fig. 1, together with a housing for the rheostat.

In the drawings, 1 is the rheostat; 2 is a battery; 3 is the wiper or arm or movable member of the rheostat, while the generator is marked G and the terminals of the indicating instrument are $a$ and $b$.

The movable member 3 is preferably arranged to be moved by a float-operated arm 36 positioned within the local receptacle T. The preferred form of float operated mechanism is similar to that shown and described in Letters Patent No. 1,657,855 and comprises a vertical shaft 35 geared to the movable member or wiper 3, which wiper oscillates within a housing 37 of circular shape, attached to the top of the tank. This has been a standard form of float operated device for many years.

As shown in Fig. 1 and Fig. 3 one of the two coils is connected across the battery while the other coil is connected in series with the rheostat. The rheostat wiper is grounded as indicated in Fig. 1, as are also the battery and generator, it appearing from Fig. 1 that the gas tank fitting and the indicating head are connected in a single circuit requiring only two terminals, to wit, $a$ and $b$, thereby dispensing with a multiplicity of connections, eliminating all danger of short-circuiting and rendering the apparatus suitable for use with the complicated wiring system in the modern motor car.

Referring to Fig. 3, the terminal $a$ is connected to the main coil 8 which is grounded at point 13. This terminal $a$ is also connected to coil $d$ which is also connected to the terminal $b$. This terminal $b$ is likewise connected to the rheostat resistor. Consequently, it is true that one coil is connected across the battery while the other coil is in series with the rheostat resistor, the coil 8 being properly termed a constant resistance coil while the coil 11 is a variable resistance coil. The armature 12′ is mounted at the point 12 which is positioned in the open field common to said coils. The two coils 8 and 11 are preferably shown nested together and positioned at a predetermined angle in their relation one to the other as hereinafter more fully described. The indicator pointer is connected to the armature 12′ so that it moves in unison with said armature. The support for the coils as shown in Fig. 5 consists of a cross arm 5 secured to the case of the instrument, a main arm 6 with the flanges 7 adapted to contain and hold the main coil 8 also the supplemental arm 9 with cooperating flanges 10 adapted to contain and hold the supplemental coil 11. The material of the supplemental arm is such that it can be bent and the relative position of said supplemental coil can thereby readily be changed in its relation to the constant coil whereby the two coils can be positioned at a predetermined angular relation as heretofore mentioned.

By studying the graph shown in Fig. 6 it will readily appear that with a standard form of compensating instrument, having the scale characteristics of a D'Arsonval galvanometer, i. e. equal scale movement for equal increments of voltage the curve denoting the increases of resistance necessary to produce the same uniform angular deflections of the pointer and armature throughout a scale range sufficient to indicate full, ½, ¼, ⅛ and 1/16 liquid level positions in a manner satisfactory to the automobile manufacturer is such as to preclude the use of a desirable form of resistor, such as the strap rheostat, because the taper of the resistor base due to the rapidly mounting resistances at the high resistance end will have to be of such pronounced character as to make it difficult to wind the wire properly on said resistor base, whereas with the cross-coil instrument the curve for the same liquid level positions is of an entirely different character, being flattened out, so to peak, such that the resistor base need only be slightly tapered at its intermediate position making a more satisfactorily wound rheostat.

Another advantage afforded by this invention, as will be apparent from Fig. 6 is that, in the present device, above a certain point on the scale (approximately 5/16) the resistance required is greater than for the uniform scale type instrument. This permits of making the narrow portion of the resistor base much wider than for the uniform scale instrument, thus affording a distinct advantage in winding because of the increased strength of the resistor base.

The improved rheotat provided by this invention includes a resistor base comprising a flat strip 14 of bendable material adapted to have resistance wire wound thereupon. One end portion 14ª of the base is relatively narrow whereas the opposite end portion 14ᵇ is relatively wide. Thus it will be seen that when wrapped with resitance wire one end portion will afford substantially more resistance per unit of length than will the other end. To afford varying resistances the base is formed, intermediate its ends, with gradually tapered portions 14ᶜ and 14ᵈ connected by a substantially non-tapered portion 14ᵉ. The portion 14ᵉ connects the larger end of the tapered portion 14ᶜ with the small end of the tapered portion 14ᵈ. The other ends of the portions 14ᶜ and 14ᵈ are connected with the end portions 14ª and 14ᵇ respectively.

It may therefore be said that in the electrical apparatus shown herein there is connected in circuit a rheostat having a resistor of greater resistance per unit of length at one end than at the other with a cross-coil indicating instrument. One coil is connected across the source of current and the other coil in series with said resistor, and thereby the pointer of the indicator has generally decreasing increments of scale movement for equal increments of voltage applied to the said series coil, as the pointer advances from 1/16 position to its full position. Conversely stated, the pointer will have generally increasing increments of movement for equal decreases of voltage as it approaches the empty position of the tank, which will avoid the difficulty of rapidly mounting resistances at the 1/16 full position, permitting the use of a resistor of a reduced taper at its intermediate position.

Although the improved indicating device is described herein as having the high resistance end of the resistor and the expanded portion of the scale corresponding to the "empty" tank position, it is to be understood that this is not essential and that they both may be arranged to correspond to "full" tank position. It is essential only that the relation of the two remain the same, i. e. that the high resistance end of the resistor correspond to the expanded portion of the scale.

Having thus revealed this invention, I claim as new and desire to secure the following combinations and elements, or equivalents thereof, by Letters Patent of United States:—

1. In an electrical liquid measuring device a receptacle, a source of current, a rheostat including a movable element and a resistor of greater resistance per unit of length at the end corresponding to the empty receptacle position than at the other end, the full receptacle position corresponding with the low resistance end of the resistor, an indicator including two coils, one connected across the source of current and the other in series with said resistor, a movable element positioned to be actuated by the said coils, and a pointer operated by said element and having generally decreasing increments of scale movement for equal increments of voltage applied to said series coil as said movable element advances from the high resistance end of said resistor toward the low resistance end thereof.

2. In an electrical liquid measuring device a receptacle, a source of current, a rheostat including a movable element, a resistor having a narrow and a wider end, said ends affording, respectively, lesser and greater resistance per unit of length the resistance per unit of length being greater at the end corresponding with the empty receptacle position than at the opposite or full receptacle position, an indicator including two coils, one connected across the source of current and the other in series with said resistor, a movable element position to be actuated by the said coils, and an indicator operated by said element having generally decreasing increments of scale movement for equal increments of voltage as said movable element advances from the high resistance end toward the low resistance end of said resistor.

3. In an electrical liquid measuring device the combination of a receptacle with a source of current, a rheostat including a movable element and a resistor of greater resistance per unit of length at one end than at the other, one end corresponding to the empty receptacle position and the other to the full receptacle position, an indicator including two coils, one connected across the source of current and the other in series with said resistor, a movable element positioned in the open field adjacent said coils and capable of being actuated by said coils and a pointer operated by said element, the latter being affected by said coils so as to give said pointer a movement having generally decreasing increments of scale movement for equal increments of voltage applied to said series coil as said movable element advances from the end of the resistance having the greatest resistance per unit of length to the other.

4. In an electrical liquid measuring device the combination of a receptacle with a battery and a generator constituting sources of current, a rheostat connected with the sources of current and including a movable element and a resistor of greater resistance per unit of length at the end corresponding to the empty receptacle position than at the other end, the full receptacle position corresponding with the low resistance end of said resistor, the intermediate portion between the low resistance and high resistance end being slightly tapered, an indicator including two coils, one connected across the source of current and the other in series with said resistor, a movable element actuated by said coils, a pointer operated by said element and having generally decreasing increments of scale movement for equal increments of voltage applied to said series coil as said movable element advances toward the low resistance end of said resistor.

5. In an electrical liquid measuring device the combination of a fitting secured to said receptacle with a rheostat arm actuated by the float of said fitting, a housing secured to said fitting, a rheostat within said housing having a resistor with windings of wire, the cross sectional area of said windings being non-uniform and having a greater resistance per unit of length at one than the other, an indicator including two cross-coils, one being connected in series with said resistor, a movable element positioned to be actuated by said coils, and a pointer connected to said movable member and requiring less resistance to be inserted in the line to produce a predetermined deflection of said pointer when said rheostat arm is near the end having the greater cross sectional area and resistance, than is required to produce the same deflection in a similar standard compensating instrument.

6. In an electrical liquid measuring device, the combination of a receptacle with a rheostat, a battery and a generator connected in circuit with said rheostat, said rheostat including a movable element and a resistor of greater resistance per unit of length at the end corresponding to the empty receptacle position than at the other end, an indicator including two coils, one connected across the battery and generator and the other in series with said resistor, a movable element positioned to be actuated by the said coils, and a pointer operated by said element and having generally decreasing increments of scale movement for equal increments of voltage applied to said series coil as said pointer advances toward the full receptacle position.

7. In an electrical liquid measuring device the combination of a tank with a source of current, a rheostat including a movable element and a resistor of non-uniform cross section having greater resistance per unit of length at one end than at the other end, the one end corresponding with the high resistance end of said resistor, an indicator including two coils, one connected across the source of current and the other in series with said resistor, a movable element positioned to be actuated by the said coils and a pointer operated by said element having generally decreasing increments of scale movement for equal increments of voltage applied to said series coil as said movable element advances from the high resistance end of said resistor toward the low resistance end thereof.

8. A rheostat comprising a base member having a convoluted wire resistance wound thereon, the cross sectional area of said base member being much greater at one end than at the other, said base member having intermediate portions of slightly tapered conformation connected by a portion the cross-sectional size of which is determined by the ends of the adjacent tapered portions.

9. A rheostat comprising a convoluted wire resistor and base member, said resistor having a greater increment of resistance per unit of length at one end than at the other, and the base member being properly tapered at its intermediate portion to permit the turns of the resistor to remain positioned on said base member as wound.

10. A gasoline measuring device for automobiles combining a tank; a float located within the tank; a relatively small and flat housing mounted on said tank; a rheostat located within said housing and comprising a substantially C-shaped resistor of strap form varying in width between its ends and affording unequal resistance per unit of length at different points intermediate its ends; an oscillatory shaft connected to be actuated by movements of said float; a wiper arm connected with said shaft and adapted to ground said resistor at various points thereby to vary the resistance effected thereby; a source of current; a cross-coil indicator mounted on the automobile adjacent the driver's seat, said indicator comprising one coil connected across said source of current and another coil connected in series with said resistor; an armature positioned to be actuated by the effect of said coils; a pointer actuated by said armature; and a scale cooperating with said pointer to indicate the amount of gasoline in said tank.

11. A liquid measuring device combining, with a tank, a float located within the tank; a shaft oscillated by vertical movements of said float; a rheostat mounted in a cap supported by said tank adjacent one end of said shaft and comprising a wiper arm secured to said shaft and a cooperating resistor element flat in cross section and substantially C-shaped in plan and affording different resistances per unit of length at different points intermediate its ends; a source of electrical current; a cross-coil indicator comprising one coil connected across the source of current, another coil connected in series with said rheostat, an armature positioned to be actuated by the effect of said coils, a pointer operated by said armature, and a scale cooperating with said pointer.

In witness whereof, I hereunto subscribe my name.

MOSES E. CHENEY.

CERTIFICATE OF CORRECTION.

Patent No. 1,745,782.        Granted February 4, 1930, to

MOSES E. CHENEY.

It is hereby certified that error appears in the printed specification of the above numbered patent requiring correction as follows: Page 4, line 65, after the word "one" insert the word "end"; and that the said Letters Patent should be read with this correction therein that the same may conform to the record of the case in the Patent Office.

Signed and sealed this 4th day of March, A. D. 1930.

(Seal)

M. J. Moore,
Acting Commissioner of Patents.

within the tank; a relatively small and flat housing mounted on said tank; a rheostat located within said housing and comprising a substantially C-shaped resistor of strap form varying in width between its ends and affording unequal resistance per unit of length at different points intermediate its ends; an oscillatory shaft connected to be actuated by movements of said float; a wiper arm connected with said shaft and adapted to ground said resistor at various points thereby to vary the resistance effected thereby; a source of current; a cross-coil indicator mounted on the automobile adjacent the driver's seat, said indicator comprising one coil connected across said source of current and another coil connected in series with said resistor; an armature positioned to be actuated by the effect of said coils; a pointer actuated by said armature; and a scale cooperating with said pointer to indicate the amount of gasoline in said tank.

11. A liquid measuring device combining, with a tank, a float located within the tank; a shaft oscillated by vertical movements of said float; a rheostat mounted in a cap supported by said tank adjacent one end of said shaft and comprising a wiper arm secured to said shaft and a cooperating resistor element flat in cross section and substantially C-shaped in plan and affording different resistances per unit of length at different points intermediate its ends; a source of electrical current; a cross-coil indicator comprising one coil connected across the source of current, another coil connected in series with said rheostat, an armature positioned to be actuated by the effect of said coils, a pointer operated by said armature, and a scale cooperating with said pointer.

In witness whereof, I hereunto subscribe my name.

MOSES E. CHENEY.

CERTIFICATE OF CORRECTION.

Patent No. 1,745,782.    Granted February 4, 1930, to

MOSES E. CHENEY.

It is hereby certified that error appears in the printed specification of the above numbered patent requiring correction as follows: Page 4, line 65, after the word "one" insert the word "end"; and that the said Letters Patent should be read with this correction therein that the same may conform to the record of the case in the Patent Office.

Signed and sealed this 4th day of March, A. D. 1930.

(Seal)

M. J. Moore,
Acting Commissioner of Patents.